3,285,974
COLOR STABILIZATION OF PROPARGYL ALCOHOL
Haluk Senman, Calvert City, Ky., assignor to General Aniline & Film Corporation, New York, N.Y., a corporation of Delaware
No Drawing. Filed Oct. 15, 1963, Ser. No. 316,438
3 Claims. (Cl. 260—632.5)

This invention relates to a process of stabilizing propargyl alcohol against discoloration.

Propargyl alcohol, after preparation in the reaction of acetylene with formaldehyde followed by distillation of the crude product in the conventional manner, develops upon standing a color ranging from yellow to dark brown, depending on the length of time of storage at normal temperature. Freshly distilled propargyl alcohol has an almost water white color. A yellowish color usually develops within a few days following distillation. The color is highly objectionable where the propargyl alcohol is to be used as an intermediate in the preparation of sulfadiazine, plasticizers and specialty chemicals.

It is an object of the present invention to provide a process of stabilizing propargyl alcohol against discoloration by treatment thereof with sulfuric or phosphoric acid.

Other objects and advantages will become apparent from the following description:

I have found that freshly distilled propargyl alcohol, having a boiling point of about 115° C. and a specific gravity at 25/4° C. of 0.95, can be very readily stabilized against discoloration upon storage at normal temperature by the addition thereto of from 50 to 1,000 parts of either sulfuric acid of 95 to 99% strength or phosphoric acid of 80 to 85% strength per million parts of alcohol. The acid containing propargyl alcohol resists discoloration during storage for as long as 4 to 6 months. The presence of the small quantity of either acid in the propargyl alcohol is not at all detrimental when used as an intermediate for the aforementioned products. If the presence of acid in the propargyl alcohol should interfere in the use of the alcohol as an intermediate in chemical synthesis, it is very simple to subject the stabilized propargyl alcohol to distillation at 85 to 100 mm. pressure to obtain an acid free and water white alcohol.

The prerequisite amount of either acid may be added directly to the freshly distilled propargyl alcohol at room temperature with rapid agitation. If desired, one part by weight of the acid may be mixed with two to two and one half parts by weight of distilled water, the aqueous solution allowed to cool, and then diluted with freshly distilled propargyl alcohol to yield a solution containing any desired concentration. Such solution then may be added at room temperature to the freshly distilled propargyl alcohol with agitation.

In order to demonstrate the effectiveness of the presence of either sulfuric or phosphoric acid in the propargyl alcohol against discoloration, the following procedure was resorted to:

An 0.5% solution of 95% strength of sulfuric acid in freshly distilled propargyl alcohol was prepared by weighing out in a glass vessel one gram of distilled water to which was added ½ gram of 95% sulfuric acid followed by careful mixing. The aqueous sulfuric acid was allowed to cool, and to it were added 98 ml. of freshly distilled propargyl alcohol and thoroughly mixed. This solution was kept in an ice bath until used.

An 0.5% solution of phosphoric acid in freshly distilled propargyl alcohol was prepared as above with the exception that 0.6 gram of 82% phosphoric acid was used instead of 0.5 gram of sulfuric acid.

Freshly distilled propargyl alcohol samples were measured and placed in carefully cleaned two ounce screw top bottles to which measured amounts of acid were added with stirring. The treated samples were then placed on a laboratory shelf at room temperature for forty days and their color determined by the VCS (Varnish Color Scale), Gardner scale, standards of 1953. After 71 days the color of the samples was again determined.

The samples products having a VCS color of less than one are considered as water white. VCS values of one to two are slightly yellowish and the yellowish color progressively deepening to a VCS value of 4–5. Beyond 5, the color becomes progressively browner and at 18 the color is a deep reddish-brown.

The results of the foregoing procedure are shown in the following table:

| Sample No. | Composition of Sample ml. of Propargyl alcohol | Ml. of 0.5% Sulfuric Acid in Propargyl Alcohol | Conc. of Acid, p.p.m. | 40 days at R.T. VCS | 71 days at R.T. VCS |
|---|---|---|---|---|---|
| 1 | 40.0 | 10.0 | 1,000 | <1 | <1 |
| 2 | 42.5 | 7.5 | 750 | <1 | <1 |
| 3 | 45.0 | 5.0 | 500 | <1 | <1 |
| 4 | 47.5 | 2.5 | 250 | <1 | <1 |
| 5 | 49.0 | 1.0 | 100 | <1 | <1 |
| 6 | 49.5 | 0.5 | 50 | <1 | <1 |
| 7 | 50.0 | 0.1 | 10 | <1 | <1 |
| 8 | 50.0 | | | 1–2 | 2–3 |
|   |      |   |   | 5–6 | 7–8 |
|   |   | Ml. of 0.5% Phosphoric Acid in Propargyl Alcohol | | | |
| 9 | 40.0 | 10.0 | 1,000 | <1 | <1 |
| 10 | 42.5 | 7.5 | 750 | <1 | <1 |
| 11 | 45.0 | 5.0 | 500 | <1 | <1 |
| 12 | 47.5 | 2.5 | 250 | <1 | <1 |
| 13 | 49.0 | 1.0 | 100 | <1 | <1 |
| 14 | 49.5 | 0.5 | 50 | <1 | <1 |
| 15 | 50.0 | 0.1 | 10 | <1 | <1 |
| 16 | 50.0 | | | 1–2 | 1–2 |
|   |   |   |   | 4–5 | 6–7 |

On the 72nd day, Sample Nos. 1 to 8 inclusive were placed in an oven at 95°–100° C. for 33 hours, a color reading taken, and the samples allowed to remain in the oven for an additional 83 hours followed by a color reading. The results obtained were as follows:

| Sample No. | 95°–100° C. | |
|---|---|---|
| | 33 hours | 116 hours |
| 1 | 5-6 | 10-11 |
| 2 | 5-6 | 10-11 |
| 3 | 6-7 | 11-12 |
| 4 | 6-7 | 11-12 |
| 5 | 6-7 | 11-12 |
| 6 | 7-8 | 12-13 |
| 7 | 8-9 | 13-14 |
| 8 | 11-12 | 14-15 |

The results of the foregoing accelerated heat test clearly indicate the stabilizing effect of the acid.

I claim:

1. Propargyl alcohol containing uniformly dispersed therein from fifty to one thousand parts of an acid selected from the class consisting of sulfuric and phosphoric acid per one million parts of propargyl alcohol.

2. Propargyl alcohol containing uniformly dispersed therein from fifty to one thousand parts of sulfuric acid per one million parts of propargyl alcohol.

3. Propargyl alcohol containing uniformly dispersed therein from fifty to one thousand parts of phosphoric acid per one million parts of propargyl alcohol.

No references cited.

LEON ZITVER, *Primary Examiner.*

J. E. EVANS, *Assistant Examiner.*